Dec. 23, 1969 P. E. SLAVIN 3,486,085

MULTILAYER INTEGRATED CIRCUIT STRUCTURE

Filed March 30, 1966 3 Sheets-Sheet 1

INVENTOR.
PETER E. SLAVIN

MULTILAYER INTEGRATED CIRCUIT STRUCTURE

Filed March 30, 1966 3 Sheets-Sheet 2

INVENTOR.
PETER E. SLAVIN

INVENTOR.
PETER E. SLAVIN

United States Patent Office 3,486,085
Patented Dec. 23, 1969

3,486,085
MULTILAYER INTEGRATED CIRCUIT STRUCTURE

Peter E. Slavin, Woburn, Mass., assignor to Intelligent Instruments, Inc., Woburn, Mass., a corporation of Massachusetts Filed Mar. 30, 1966, Ser. No. 538,775
Int. Cl. H01l 5/00, 11/00, 15/00
U.S. Cl. 317—235 3 Claims

ABSTRACT OF THE DISCLOSURE

A monolithic circular silicon controlled rectifier device is formed with radial barriers to define multiple silicon control rectifier sections. Current flow through one section locks out all other sections and prepares an adjacent section for operation. When the conducting section turns off a magnetic field deflects carriers to an adjoining section so that as one SCR goes off the prepared adjacent SCR goes on. The device thus may serve as a ring counter.

This invention is in the field of multilayer semiconductor devices. It is directly related to that class of devices often termed "Shockley controlled rectifiers" (SCR), and in particular the four layer devices fabricated in silicon material, using a circular geometry.

New geometrical arrangements are described which give a high ratio of logical elements to structural elements. A ring counter arrangement is developed, which has a simple four layer structure and greatly increases the counting rate for this class of devices, (SCR's).

A Shockley controlled rectifier (SCR) is basically a four layer device which may be thought of as a pnp and an npn transistor in series. Each "transistor" supplies the base current for the other so that, once turned "on" (conducting), the base control is lost, and they must be turned off by breaking the main current path. They are slow to turn off because of the time needed to clear the minority carriers out of both bases.

Multiple SCR's may be made on the one chip (base) of silicon (p-doped) material by appropriate design of the photo-lithographic mask and diffusion materials and conditions. The SCR's may then be interconnected by other related techniques for making resistors, small capacitors,—all on the same chip or wafer but external to the SCR itself.

It is another object to provide very direct and simple coupling between SCR elements, so that many fewer external elements (resistors) are needed.

It is still another object to provide a very simple multi-SCR structure, such that one of the SCR's is "on" and the remainder "off." An example of this use would be in storage of a decimal digit-one in ten being "on."

It is yet another object to modify the base structure of an SCR element so that it may be cleared of minority carriers in very short time.

This invention features the division of a circular geometry (planar epitaxial) SCR into multiple SCR's with inter-base resistance structure such that base carriers may be moved directly (drift) into a neighboring base upon switching.

This invention also features the introduction of resistive and capacitative properties in a multiple SCR necessary for coupling counter stages directly into the first emitter or base regions.

A further feature of this invention is the application of a magnetic field at right angles to the direction of carrier movement (i.e. current flow) whereby the multiple SCR becomes a forward-backward ring counter according to the direction of this magnetic field.

According to this invention this magnetic deflection (Hall) effect may be emphasized by modifying the common emitter structure of the SCR's. However, these and other features of the invention, along with further objects and advantages thereof, will become more readily apparent from the following detailed description of preferred embodiments thereof, with reference being made to the accompanying drawings, in which.

Figure 3:
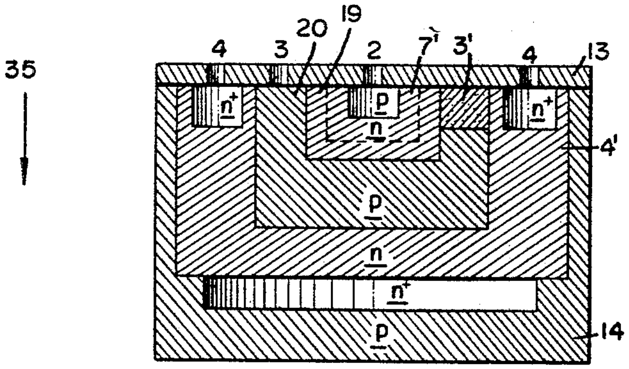
Figure 4:
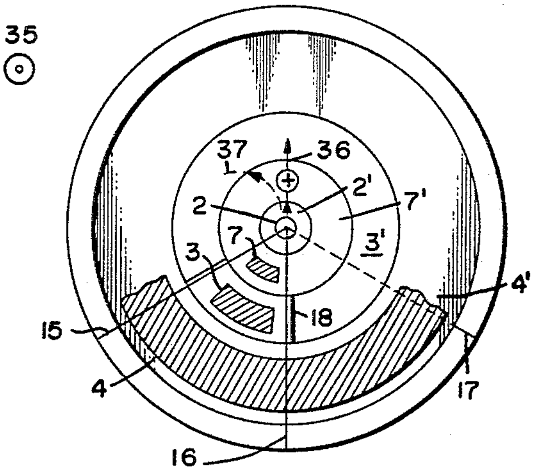
Figures 5, 6, 7:
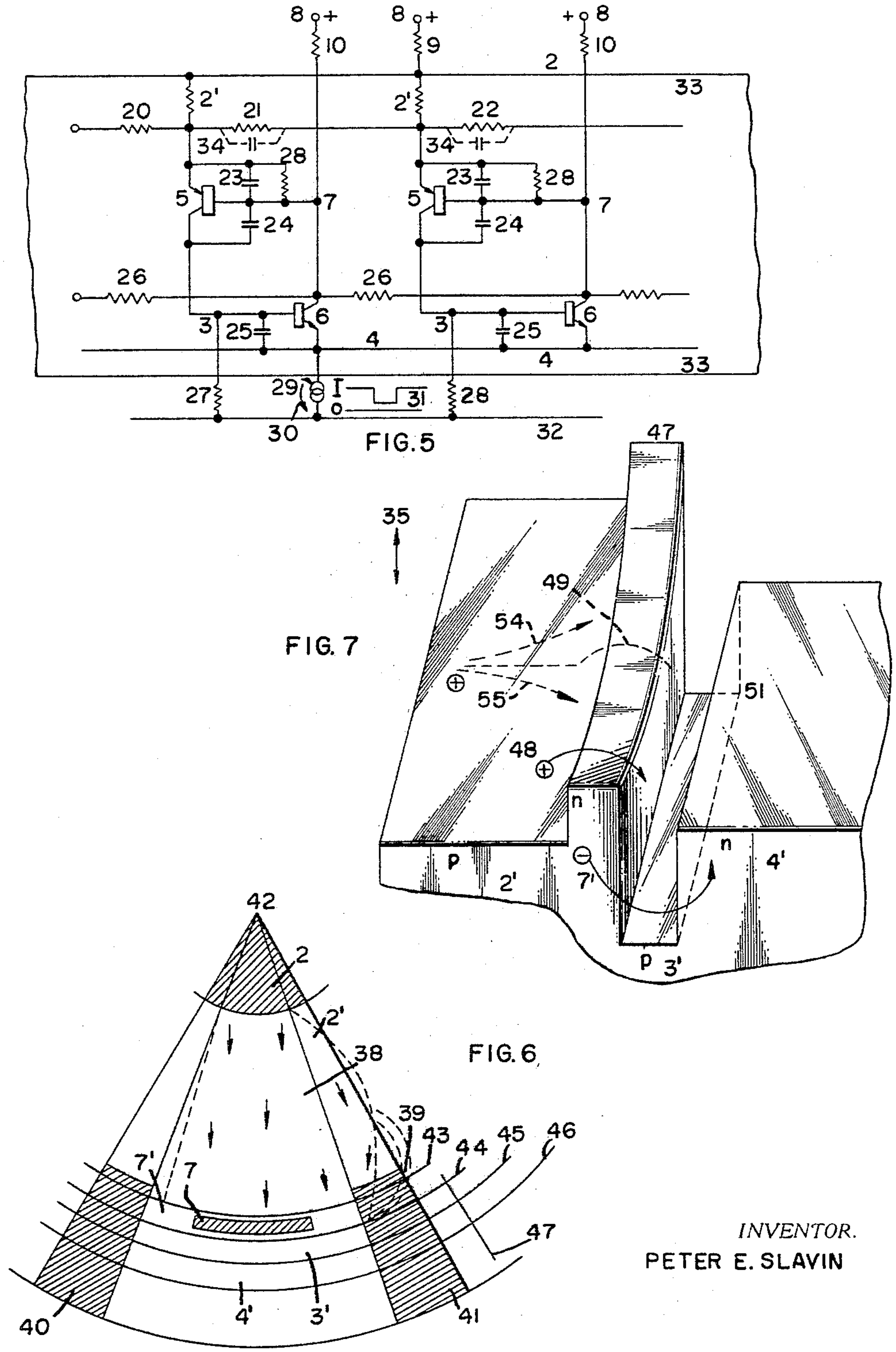
Figure 8:
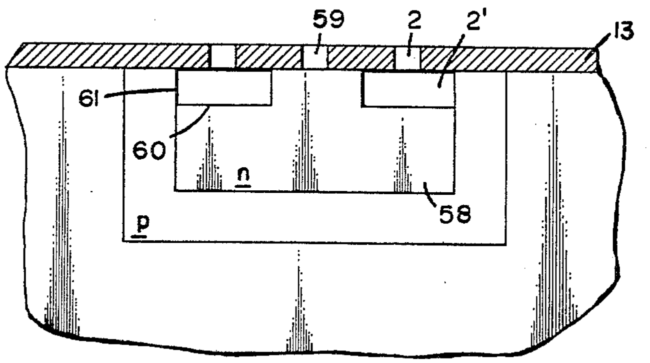
Figure 9:
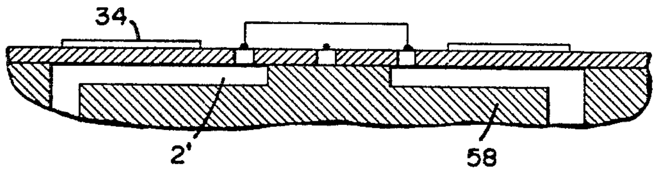
Figure 10:
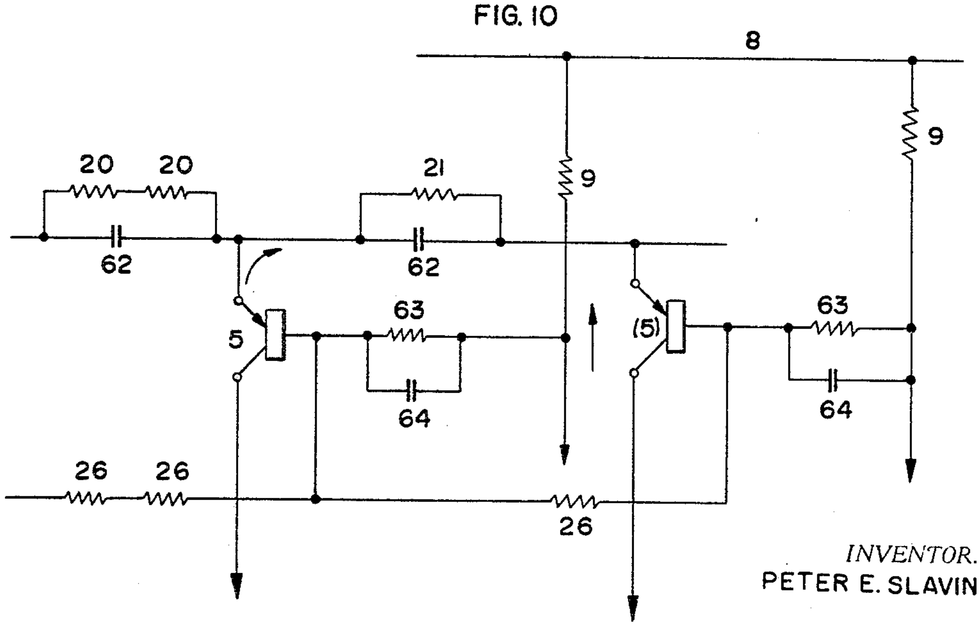

FIG. 3 is the sectional view of a wafer having a four layer SCR device diffused into it, FIG. 4 is the top view of this wafer, with a radial portion broken away to show details of construction, FIG. 5 is a diagram of the equivalent circuit for the FIG. 4 device including the capacities and resistances inherent in the structure. The diagram also provides the biasing resistors and the arrangement of driving it as a counter, FIG. 6 is a fragmentary sectional plan view of an alternate form of a segmented SCR for use as a storage, FIG. 7 is a schematic representation of the energy levels in a segmented SCR showing the effect of a magnetic field at right angles, FIG. 8 shows a fragmentary sectional side view of the emitter of a segmented SCR modified so as to increase the magnetic deflection effect, FIG. 9 is a detail sectional view of the emitter of FIG. 8, showing the thin emitter and the distributed capacity across the first emitter region, and, FIG. 10 is a circuit diagram illustrating the principal mode of coupling during switching for counting operations.

By way of introduction the invention includes a segmented single SCR such that it will provide storage such as one decimal digit, thereby achieving economy of cost, economy in the number of elements and economy of power. By modifying this structure a very simple forward/backward counter results. These modifications are three: a longitudinal reversible magnetic field, a resistance-capacitance coupling *inside* the SCR and a sideways electric field in the base as fast coupling during counting.

Figure 1:
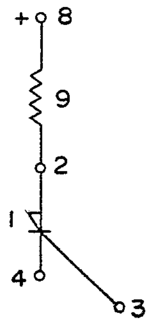
FIG. 1 shows the usual diagrammatic symbol for an SCR in a circuit.

In FIG. 1 there is shown the usual symbol for an SCR. Here 2 is the "anode" (first emitter), 4 is the "cathode" (last emitter), and 3 is the "gate" (npn base). When the gate 3 is made positive with respect to 4, then the SCR 1 goes "on," connecting 2 to 4 with a voltage offset on the order of one volt, and the current is then determined by the supply voltage 8 and resistance 9.

Let us suppose that one wished to store several decimal digits expressed as binary coded decimal (BCD), then the four binary bits per decimal could be paired to four SCR's, such that the "one" bits caused the SCR(s) to go on, that is, to "fire." As noted before these "fired" SCR's will then remain on independent of the gate voltage.

One could also store the decimal digit as one SCR "on" and nine SCR's off. This may have certain advantages such as less power dissipation and better match to readout devices, but is wasteful of the semiconductor devices.

Figure 2:
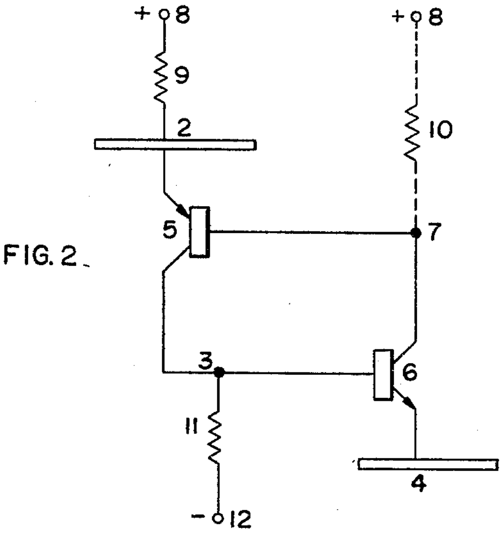
FIG. 2 is a diagram of the simplest form of the equivalent circuit.

In FIG. 2 the principal elements of an SCR are analysed as a pnp transistor 5 and an npn transistor 6 in series. The gate 3 is shown with an external bias resistor 11 returned to negative voltage 12. The first base 7 is shown brought out, with the option of connecting to positive bias voltage 8 via resistor 10. In usual SCR structures this is not done, and the increase in pnp 5 leakage due to high base resistance is absorbed by bias current via 11.

The device is turned "on" (usually) by positive increase of the gate 3 voltage and current past a critical point, (the threshold) typically 0.5 volt and 1.0 ma. The device "fires" when M ($ap+an$) approaches unity. Here M is the multiplication of carriers (spontaneous pairs) dependent upon the voltage across the SCR from 2 to 4. The $ap$ is the collector gain of pnp 5, and $an$ that of npn 6, where the gain is low at low (microampere) currents.

The turn-off is often done by capacity coupling a negative pulse into the "anode" 2. This will clear out the minority carriers in the pnp base 7 rapidly, but there is some delay and confusion with the npn base 3, as the junction voltage 5 to 7 may exceed inverse breakdown.

For two SCR's coupled together there is the sequence that A being on applies a bias to the gate of B, a subsequent trigger pulse "fires" B, and B couples back to A to turn it off, (for example via a capacity between anodes). Notice that in a counter this involves several serial delays including gate preparation, cleaning out *both* base regions of the SCR going off, and recovery of coupling capacity.

In FIG. 3 there is shown a view through a section of an SCR, and in FIG. 4 a top view of the SCR. The four active regions are labelled pnpn from the top center down, corresponding to regions $2^1$, $7^1$, $3^1$, $4^1$, and contacts 2, 7, 3, 4.

The wafer material is originally p, and part of this material remains at 14, where it is biased off at all times. The n+regions are needed at the metallic contact areas. There are three characteristics of this conventional circular geometry that are now pointed out.

First, the structure is large, due in part to the extra layers, and thus maximum gain occurs at fairly high currents. Conversely, at very low currents there is a minimum (the holding current) at which the loop gain may go below unity, and the SCR spontaneously switches itself off.

Secondly, the tolerances on the diffusing distances are such that the base regions ($7^1$ of the pnp, and $3^1$ of the npn) are somewhat thicker than in transistors. The diffusion capacity, which varies to thickness squared, is thus relatively high in an SCR. The intrinsic junction capacity is small; —about one picofarad. High inverse voltage will widen the junction depletion layer (say, the line between regions $7^1$ and $3^1$) and thus effectively reduce base width. While the intrinsic capacities may seem trivial, it is well known that a very rapid rise of anode voltage can "fire" the SCR by injecting carriers via these capacities.

Third, the base resistances influence drift and diffusion velocities as well as minority carrier lifetimes. The "sheet" resistance is that of a region at right angles to a radius, and varies inversely to thickness, mobility and number of carriers. The base resistance may be uniform, or it may be "graded," or it may include an intrinsic region produced by mutual cancellation of the p- and n- dopes. The minority carriers in the base region $3^1$ prefer to travel in paths close to the upper (contact) surface, so that four fifths of the region's resistance is in the vertical section (see $7^1$ and $3^1$ of FIG. 3).

Suppose that this multilayer "pie" now be separated by radial barriers into sectors, each sector being a separate SCR. Such a barrier is shown as the cross-hatch in region $3^1$, or as 18 in FIG. 4. That is, the first p and n regions have been left common, as well as the last n region, and the "gate" (second base, p) region sliced up. The first base region $7^1$ could have been the one to slice, with the advantage that the minority carriers (electrons) in $3^1$ could have shifted circumferentially with a higher mobility (five times that of holes). However, the Hall effect consideration (to be introduced) makes the slice of the second base preferable.

This barrier is essentially a high resistance (say 50,000 ohms) a few microns thick. A laser could be used to give a barrier about 2 microns wide by 20 deep (a 10 to 1 ratio suited to the optics), but would leave exposed surfaces. An ion beam can implant such a barrier, but at present the precise positioning of the beam is not economic. This leaves a double diffusion wherein the barrier is created by a first light diffusion of n dope just sufficient to give intrinsic resistivity for $3^1$.

The arrow 35 in FIG. 3 gives the direction of an imposed magnetic field. The dot 35 of FIG. 4 means an arrow into the paper. In the presence of this field the carriers moving at right angles as at 36 will initially be deflected as shown at 37. When this deflection path is straight again there is a gradient of carrier density such as to give an electric field force equal and opposite to this original "motor" force.

This division of a single SCR "pie" into many sector SCR's accomplishes three aims. First, as will be shown, any one SCR being on will "lock-out" the others. Two, a longitudinal magnetic field can be used to "steer" carriers in emitter 2' into adjacent SCR's, and at switching there will be a coupling in base region 7'. Third, there is an economy of structure which is accompanied by an ability of an SCR to work at low (logic) current levels—since junction current density stays the same, but there is now much less junction area per SCR.

In FIG. 5 there is shown the equivalent circuit for two adjacent SCR (sectors) of FIG. 4. The first emitter, the p of the pnp, is shown at 2 as a resistance, because the emitter radius has been made very large (see 2' of FIG. 6) and the resistivity increased, (which also increases emitter loss). There is also a shunting resistance between adjacent pn junctions, i.e. resistances 20, 21, and 22 of FIG. 5. There is still only the one external (emitter) p contact, that is 2 of FIGS. 5 and 6. There is a capacity 34 between adjacent junctions which will be explained later.

The capacitances 23, 24 and 25 represent intrinsic junction capacity plus equivalent diffusion capacity for the SCR which is on. The resistors 28 represent junction leakage, and resistors 26 the "sheet resistance" between adjacent first base regions 7. Lines 33 mark the boundaries of that part of the circuit which is internal to the SCR's, so that region 7 is "brought out" via resistor 10 to positive bias 8.

The "gate" 3 (second base) is returned via resistor 27 to a negative voltage at 32. The common second collector 4 is returned via a current switch 29 to voltage 32.

The current 30 has the wave form shown in 31. That is, the current is set (say, in an emitter follower stage) at a value corresponding to that via resistor 9 into the common first emitter 2, plus the small bias current(s) via resistors 10 and 28, less the small bias current via resistor 27.

Suppose the left hand SCR of FIG. 5 to be "on." Then the voltage at the common emitter 2 will be set by the IR drop in resistor 9, and the voltage at the second common emitter 4 will be that at 2 less the IR drop in the SCR (plus a small increment). This voltage at 4 will be within the range of collector volts for emitter-follower action of the current switch 29. The right-hand SCR 5 will not "fire" because its emitter-base (2 to 7) is inverse biased, and because voltage across it (2 to 4) is too low to give carrier multiplication at turn-on. Thus the "on" SCR tends to "lock-out" all of the remaining SCR's.

At some instant the current is abruptly reduced at 30 to a low value. This causes the common emitter volatge 4 to travel positive, which in turn causes the 7 region (left-hand) and the first common-emitter 33 to travel positive. Due to the diffusion capacity of 23 (left-hand), and the series R2' of the emitter plus the cross-emitter capacity 34 the emitter of 5 (right-hand) goes more positive thn these other lines. Then, if region 7 (right-hand) had just previously been approximately zero with respect to its emitter, the right-hand SCR tends to "fire." Since base region 7(7') is common to all SCR's the right-hand SCR will tend to "remember" the low voltage of the left-hand SCR 7 when it was "on." This memory may be as low as 10 nanoseconds (5K ohms. and 2 picofarad); because the line 4 is disconnected so rapidly this "memory" will be still there as the right-hand SCR "fires."

The salient points of this transfer are: one, the coupling elements are mostly inside the SCR; two, the right-hand element can "fire" before the left-hand element is completely "off" (the internal RC's ensure that the right then "locks-out" the left when the current switch turns "on" again); three, the turn-off voltages and currents at the two bases are well-defined. In general present day SCR counter ring circuits (using external components) of course, involve the delay in three successive steps. (1) A preparing B SCR gate for a trigger (2) trigger strikes B via base (gate) current (3) B couples back to A with a negative pulse. (A base voltage being poorly defined.)

In FIG. 6, there is shown one sector SCR with a broad barrier on each side running through all but the common emitter 2′. The output points are the individual metallic connections 7. The emitter radius has been enlarged so that the length from center 42 to junction 43 may be about 50 microns. The remaining three regions are each about 10 microns, and the base material 47 any thickness. The barrier in this case may be formed by starting with n-doped silicon, and masking the shaded regions 40, 41, etc., through each subsequent diffusion. The transverse sheet resistance couples, in this case, via both base regions, 7′ and 3′. Since there is a considerable tolerance on these resistances it is necessary in the circuit to adjust voltage 8 and 32 dependent upon these resistances and output load at 7.

There is an added form of coupling which not only adds switching speeds but ensures direction of counting. That is, if the magnetic field of 35 in FIG. 3 be applied to the segmented SCR of FIG. 6, the moving charge pattern will be shifted anti-clockwise (or clockwise if field reversed) as shown by shaded area 38. This will place a few carriers in the base region(s) (near 39) of the adjacent SCR which is the next to come "on." This current, below the threshold at which low voltage SCR gain exceeds unity, discriminates in the priming action of FIG. 5, where both adjacent SCR's were "prepared." This small shift of carriers may be considered as reducing coupling resistances 21 and 26 of FIG. 5.

The amount of shift depends upon the mobility $u$ and the field strength B. This is akin to the Hall effect where tan $\theta = U_h B$, except that here the carriers do not have a fixed boundary. The $u$ factor depending upon L (mean free path), and thus upon resistivity of the emitter region. However, the diffusion constant D has much the same dependency, (Einstein's equation $D = -u$) so that the number of priming carriers at 39 is in part independent of emitter resistance and temperature.

In FIG. 7 there are shown the various energy (voltage) levers of the four regions 2′, 7′, 3′, 4′. The pnp transistor is shown by the path of a "hole" position charge 48 travelling across base region 7′. The npn has electron(s) through the last three regions. The path 49 applies to a "hole" in absence of a magnetic field; while 54 and 55 correspond to a deflection from one of the two opposite magnetic vectors of 35. The potential at the adjacent "off" base 47 is higher than at the "on" part of base at 49, though not as high as other "off" parts. It is evident that if the part 49 were suddenly lifted positive the minority carriers in the base would "drift" rapidly towards part 47 under the effect of a transverse electric field.

FIG. 8 shows an extra diffused region 58, which does not carry current as it is biased positive; whose function is to decrease the thickness of emitter region 2′. The region 13 is the silicon dioxide passivated surface, and 2 and 59 are contact materials for 2′ and 58 regions. This very thin emitter region gives three desirable effects (1) the magnetic deflection is increased as the mean free path in now constrained (2) the emitter resistivity increases (3) current patterns tend more closely to the surface where the barriers are best defined.

In FIG. 9 a small part of FIG. 8 is given, with the addition of an unconnected metallic ring 34 on the surface. This gives the capacity couping between emitters shown as 34 in FIG. 5.

Finally, in FIG. 10 there is shown the principal mode of coupling during switching (counting). There is an added element in region 7′, the series resistance 63 and the shunting capacity 64. This resistance 63 is achieved by making the np junction (44 in FIG. 6) into an n-*i*-p junction, where the *i* is intrinsic resistance material. This has the effect of placing a high positive voltage pulse at 7′ at "off" transient, without implying high voltage bias during static (one on) periods. This pulse transverse "drift" field in 7′ as discussed for FIG. 7. It is noted that with the higher resistivity emitter region the transistor 5 is more "symmetrical"—that is, the emitter and collector functions are alike, and emitter-base breakdown voltage is higher. It is also pointed out that with this high resistance in series at the first base the transverse base resistance may be reduced by two orders of magnitude, since the transverse carrier drift with the other priming effects will make the direct base memory unnecessary. It also means that the SCR (transistor 5 etc.) "firing" further locks out 5, etc., by a negative pulse on the common emitter. The effect of the magnetic field is shown by reducing the resistances 21 and 26 as opposed to those at 20 and 26—26 (left).

While the invention has been described with particular reference to the illustrated embodiments, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States, is:

1. A multiple pnpn controlled rectifier, comprising:
   (a) crystalline semiconductor having first, second, third and fourth consecutively stacked regions of alternately n type and p type material forming three spaced pn junctions therein with each terminating in respective continuous edges forming closed geometric figures on one surface of said semiconductor,
   (b) a plurality of relatively high resistance discrete zones dividing one of said second and third regions into a plurality of relatively low resistivity discrete zones with each terminating, at respective ends, in the respective pn junctions defining said one region and forming separate carrier paths therebetween, each of said carrier paths including means responsive to an imposed magnetic field for exclusively selecting a single one of said paths for current flow therein and controlling the direction of said flow.

2. A multiple pnpn controlled rectifier according to claim 1 wherein said semiconductor is of circular profile and said high resistance zones and said carrier paths are radially arranged thereabouts.

3. A multiple pnpn controlled rectifier according to claim 1 wherein said means is responsive to a magnetic field imposed perpendicularly to said zones.

References Cited

UNITED STATES PATENTS

| | | |
|---|---|---|
| 3,029,366 | 4/1962 | Lehovec. |
| 3,138,747 | 6/1964 | Stewart. |
| 3,210,621 | 10/1965 | Strull. |
| 3,213,339 | 10/1965 | Henkels. |
| 3,236,698 | 2/1966 | Shockley. |

JAMES D. KALLAM, Primary Examiner

U.S. Cl. X.R.

317—234